3,246,379
BURIAL CASKET INTERIOR
William L. Slaughter and Gladys E. Rielage, Cincinnati, Ohio, assignors to The Crane & Breed Casket Company, Cincinnati, Ohio, a corporation of Ohio
Filed Dec. 20, 1963, Ser. No. 332,120
6 Claims. (Cl. 27—19)

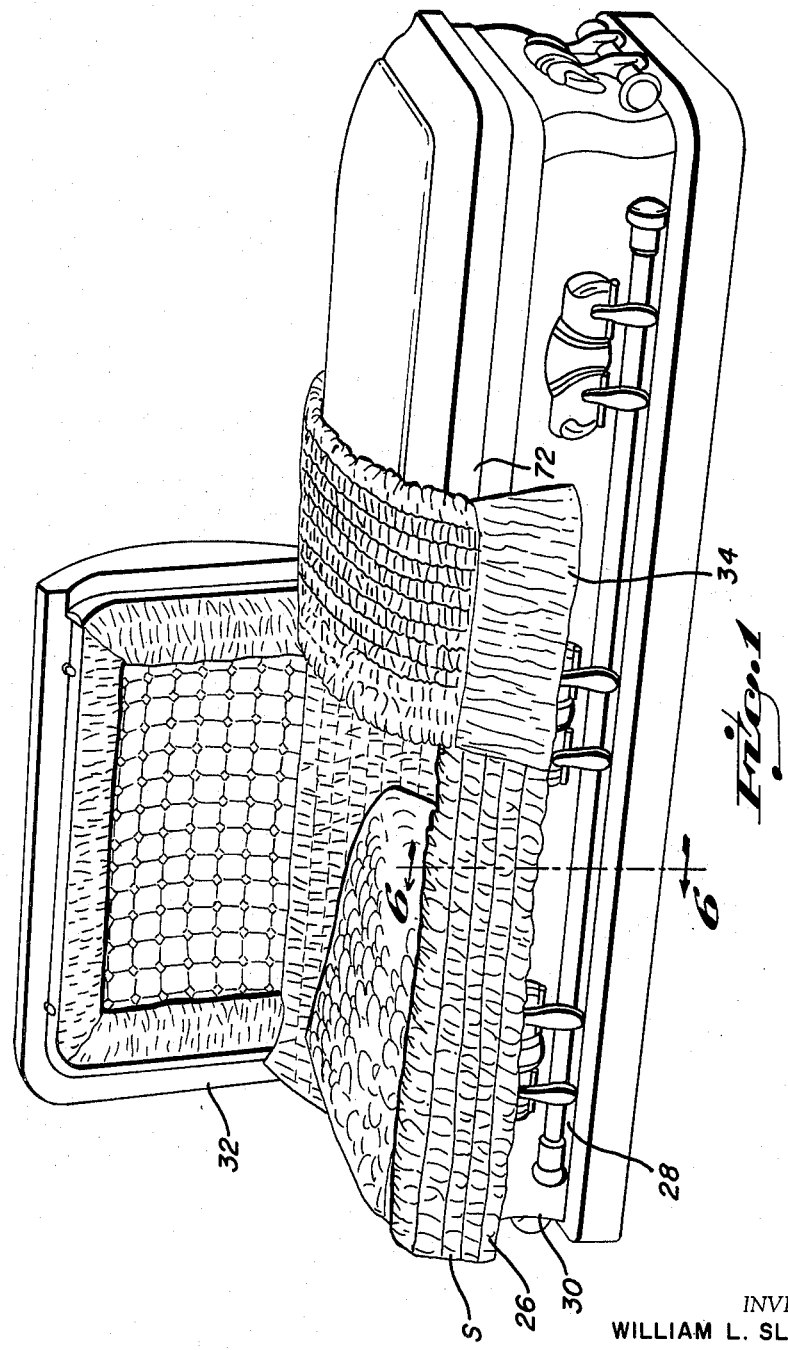

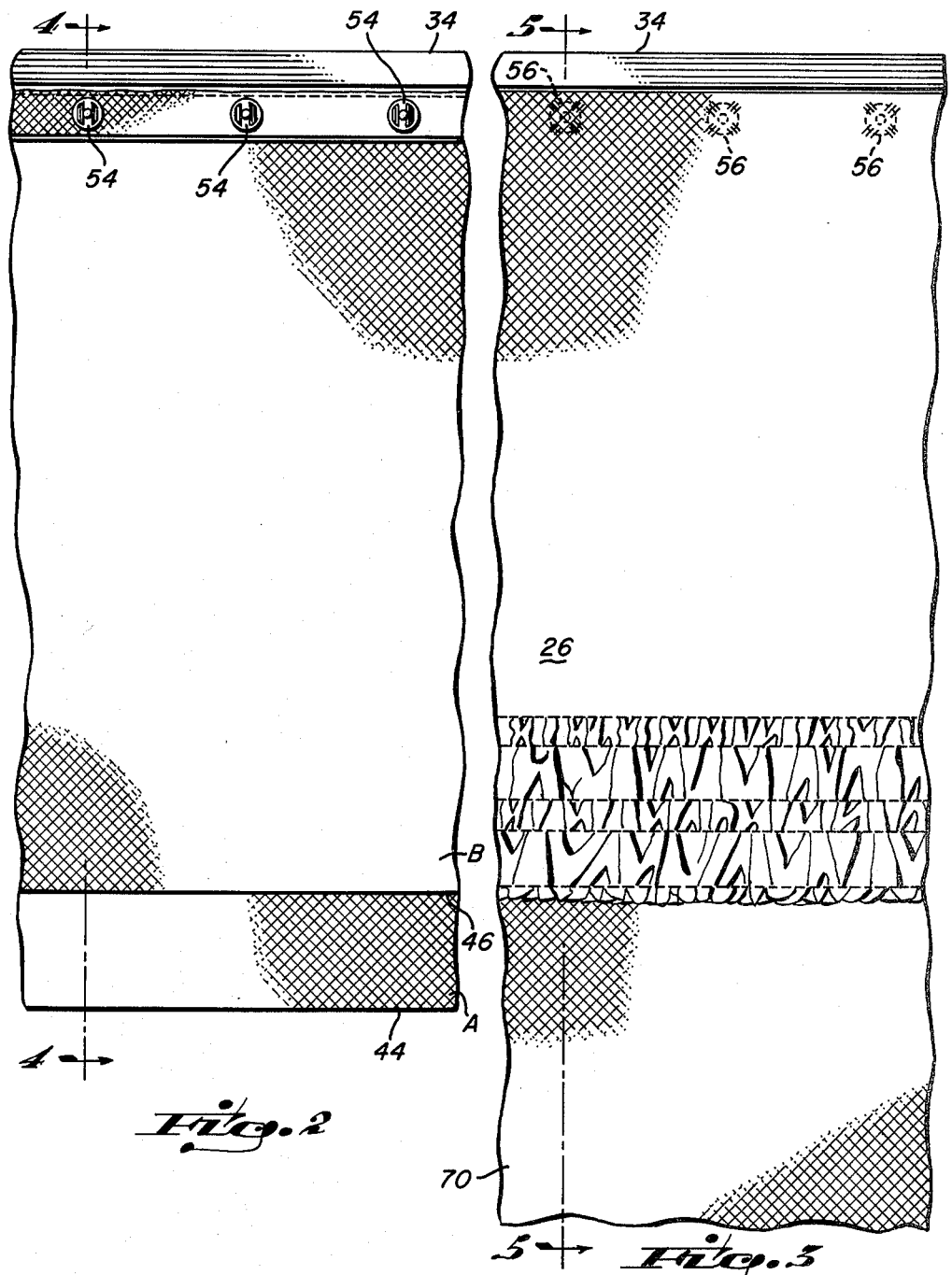

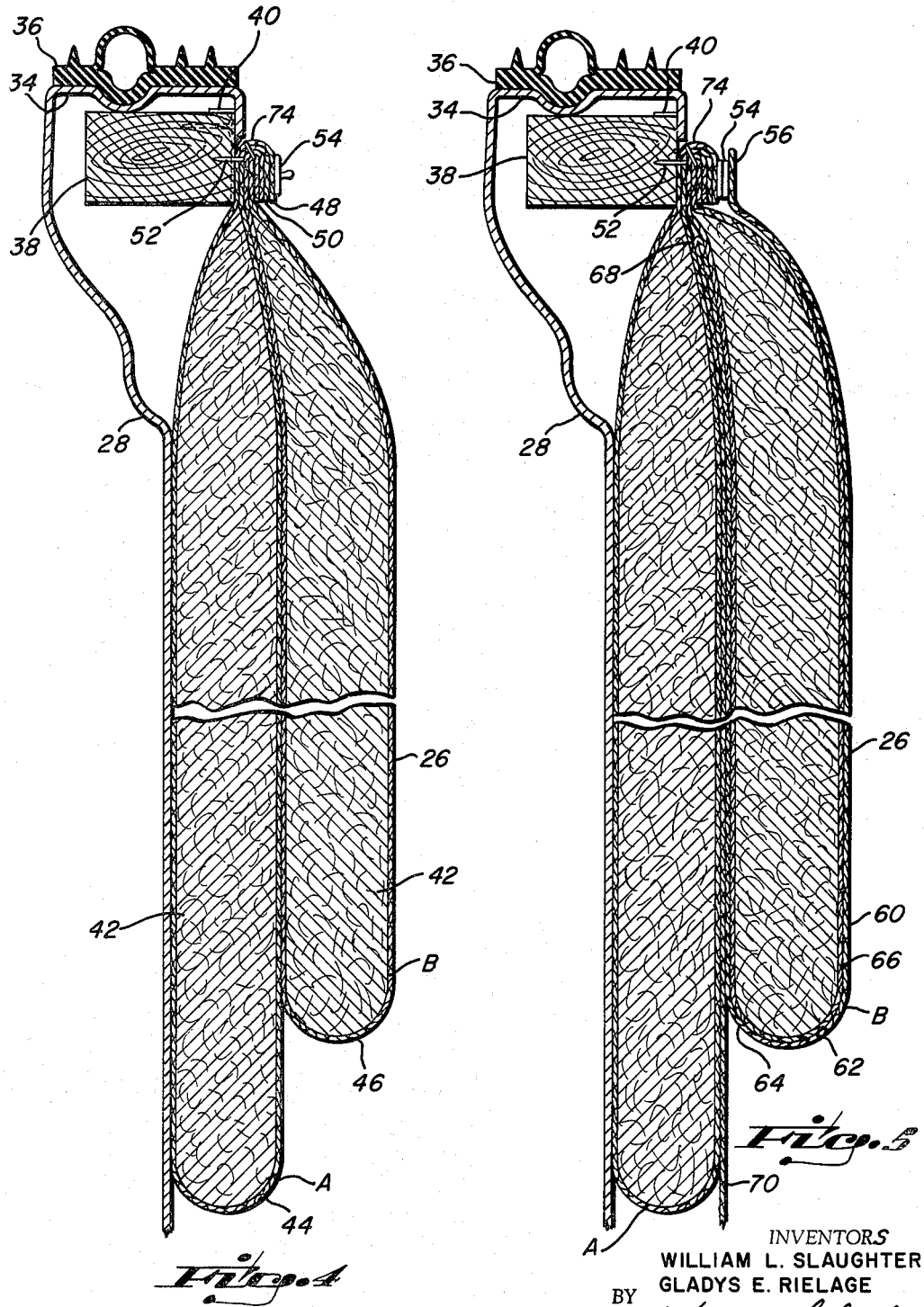

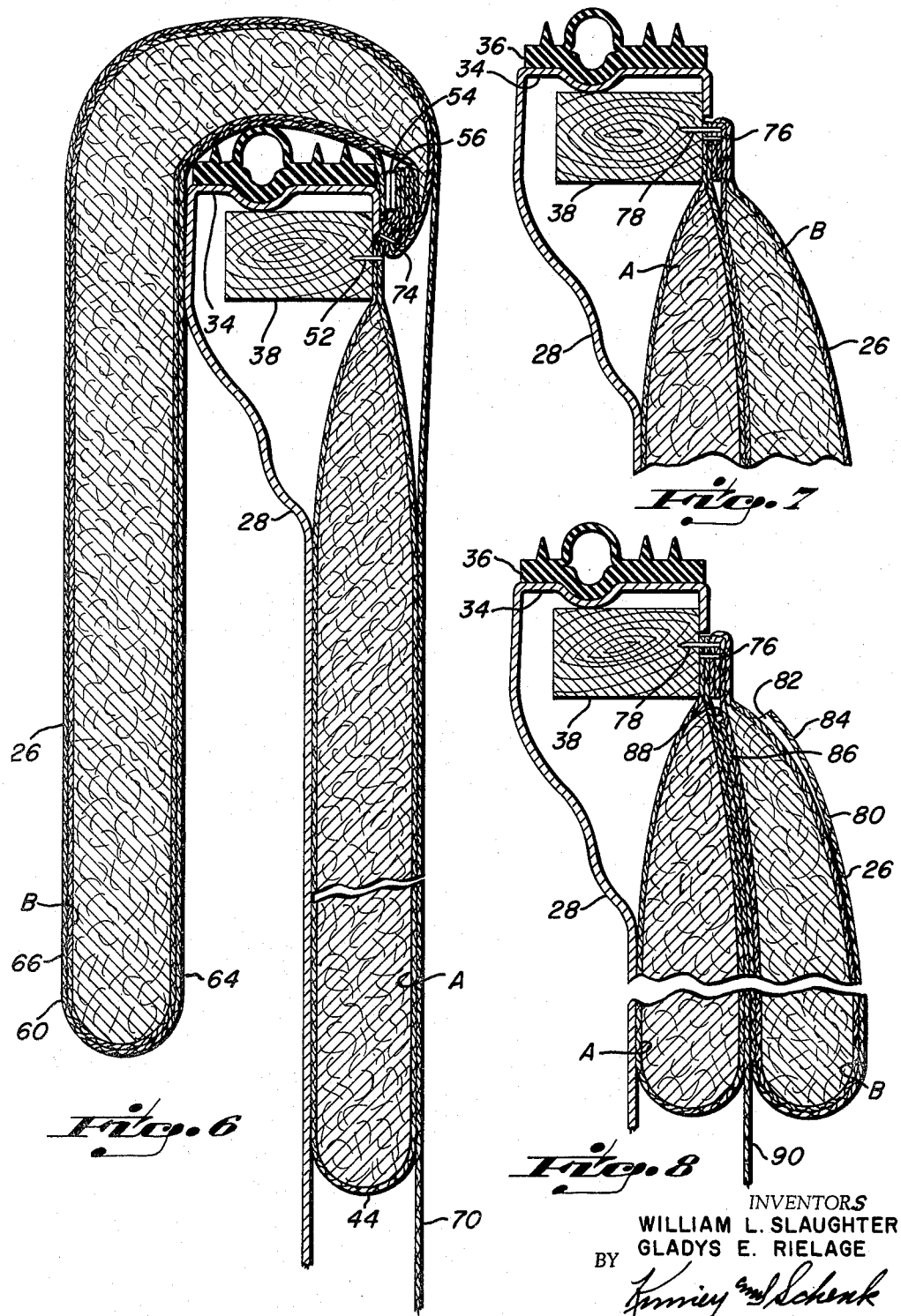

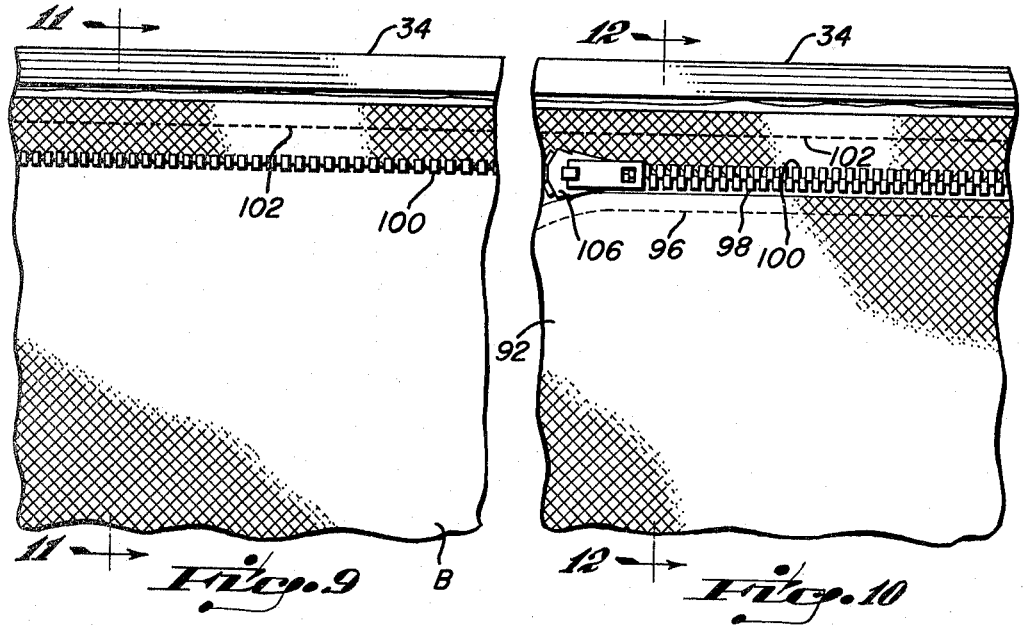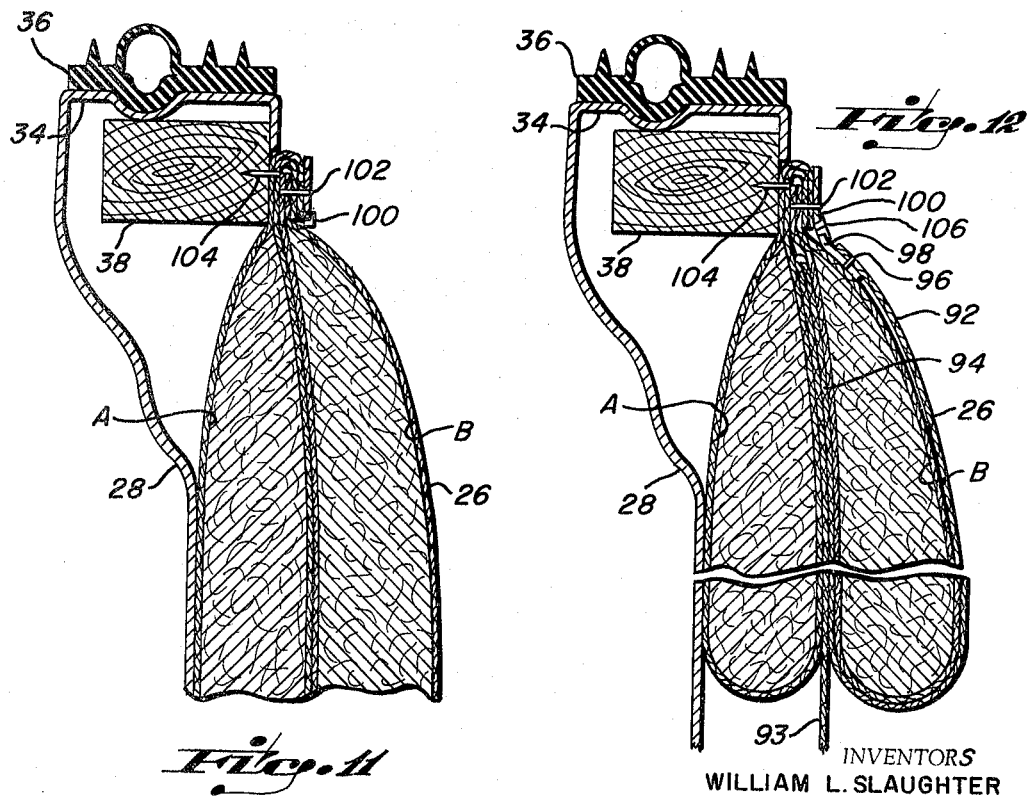

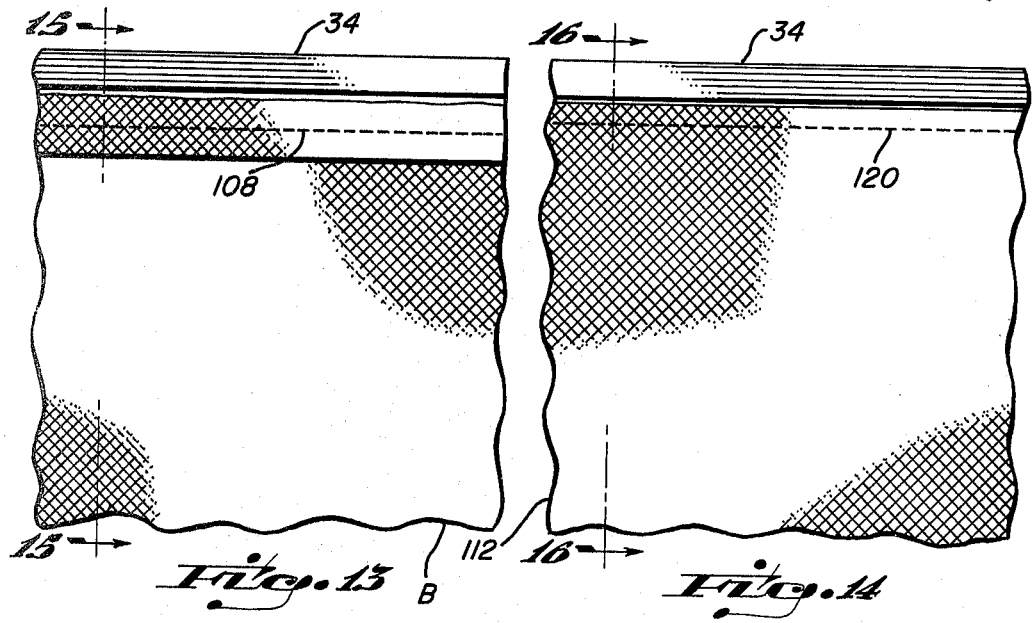
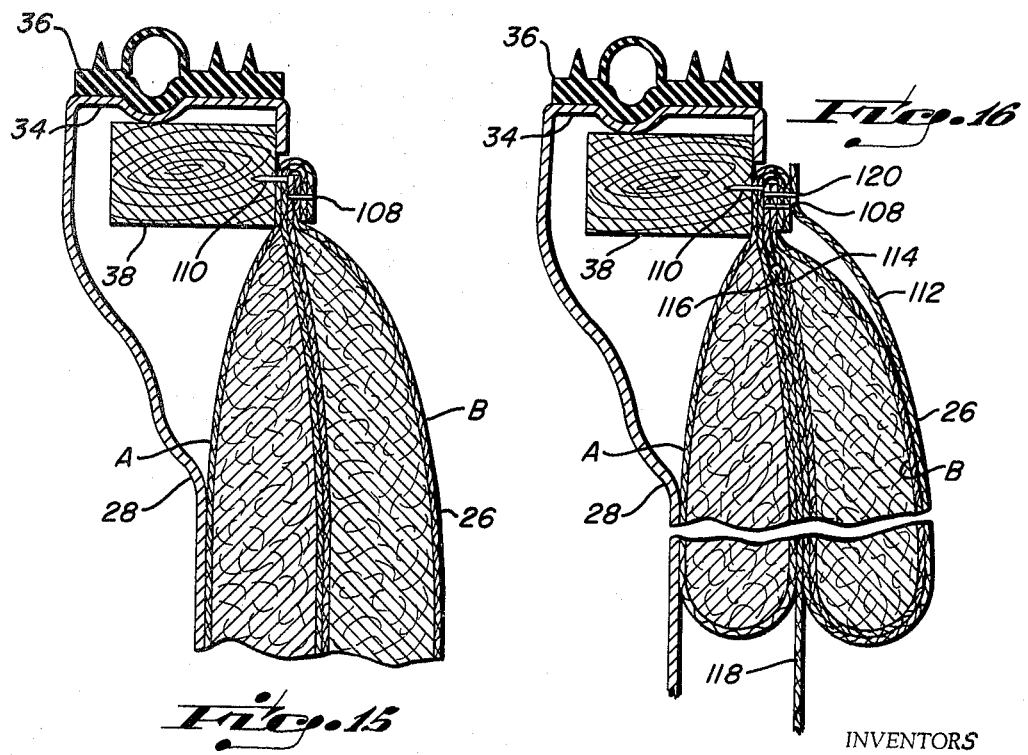

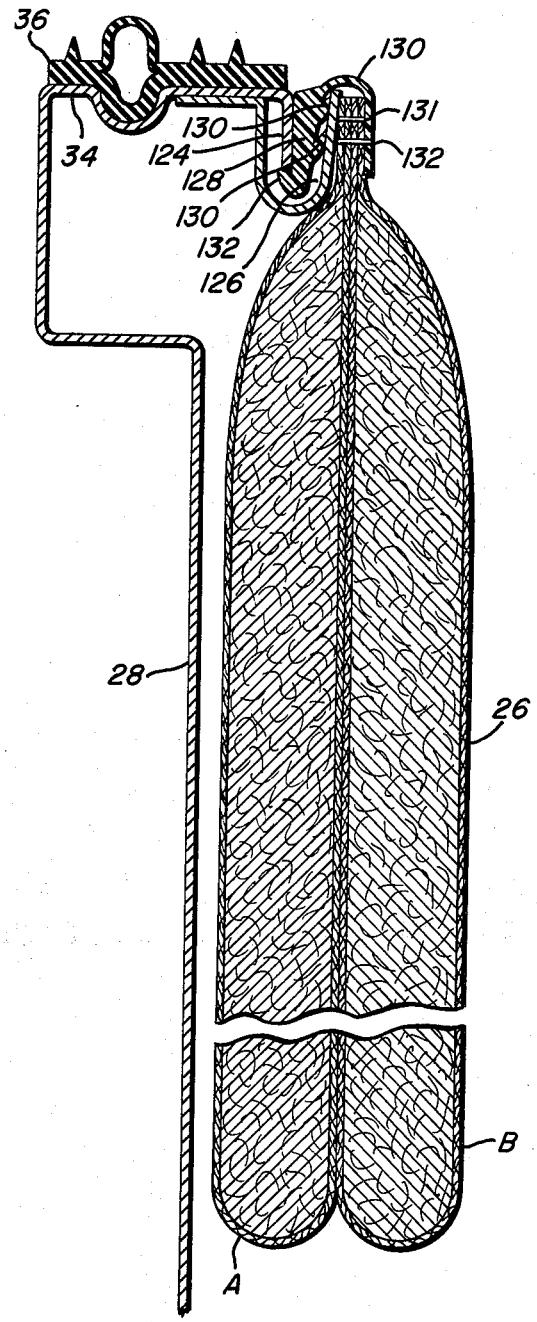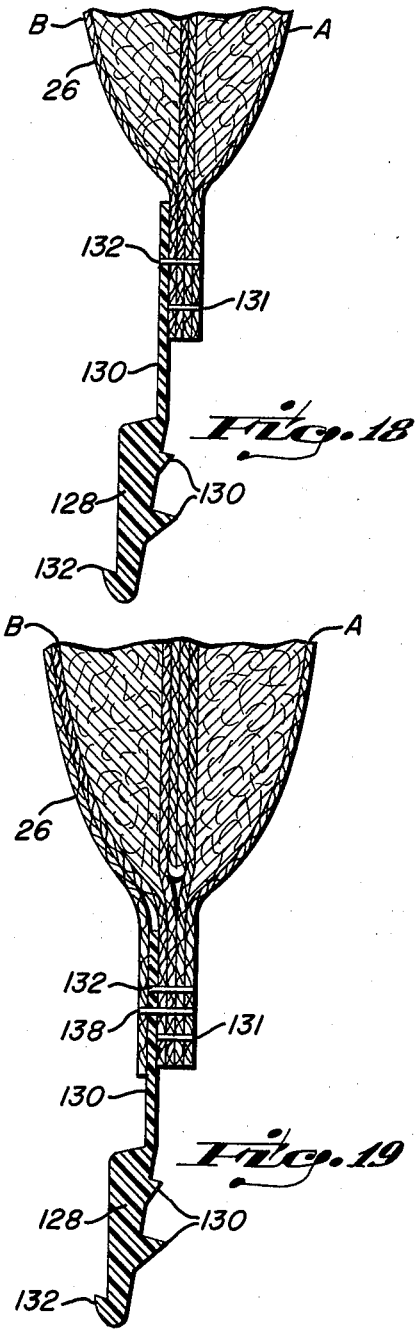

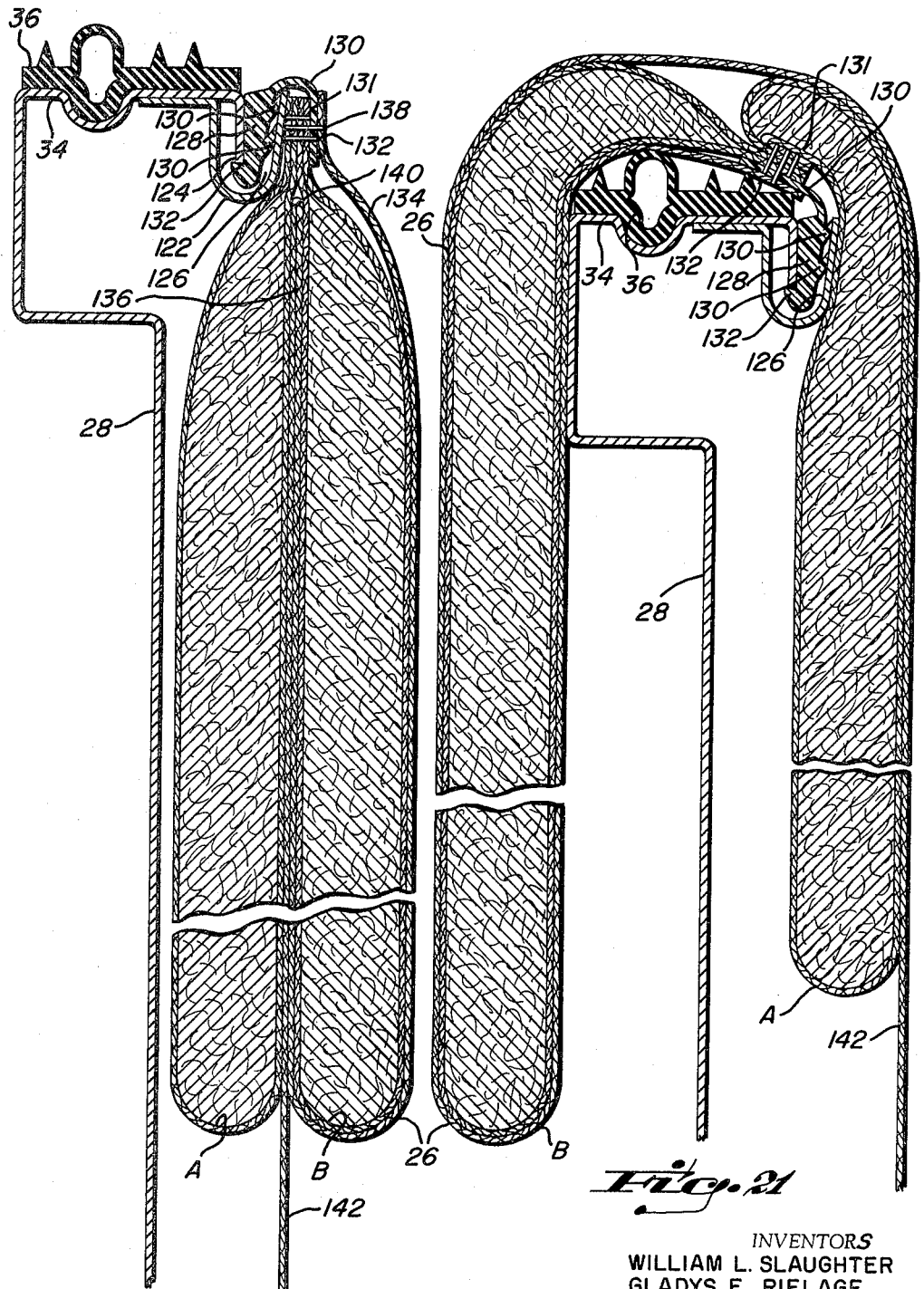

The present invention relates to a burial casket and method of assembly.

An object of the invention is to so construct burial caskets, that various decorative interiors kept on hand by a supplier or jobber for finishing the caskets, are made readily interchangeable to suit the tastes or desires of individual purchasers.

Another object of the invention is to provide for quick and easy interchangeability of interiors, so as to minimize the unit inventory to be carried by the jobber in furnishing caskets variously finished with interior fabrics of different colors, styles, and qualities as may be desired by the purchasers.

A further object of the invention is to simplify and expedite the manufacture and shipment of burial caskets by the manufacturer, and to afford purchasers a wide choice of styles and designs of caskets without delay in delivery.

The foregoing and other objects are attained by the means described herein and as illustrated upon the accompanying drawings, in which:

FIG. 1 is a perspective view of a completely finished burial casket of the half-couch type, with shrine exposed, and constructed in accordance with the present invention.

FIG. 2 is an inside elevation, illustrating a basic shrine assembly as furnished by the casket manufacturer, detachably secured to the casket body with snap fasteners.

FIG. 3 is a similar view, showing the shrine assembly as finished by the jobber or merchandiser, the shrine being inside the casket.

FIG. 4 is a cross-section taken on line 4—4 of FIG. 2.

FIG. 5 is a cross-section taken on line 5—5 of FIG. 3.

FIG. 6 is a view similar to FIG. 5, illustrating the finished shrine exposed exteriorly of the casket.

FIG. 7 is a cross-section through a casket rim, showing a modified construction in which the basic shrine assembly is secured to the casket by nailing.

FIG. 8 is a view similar to FIG. 7, showing the shrine assembly as finished or covered with decorative fabric, by the jobber or merchandiser, without the use of fasteners.

FIG. 9 is an inside elevation, illustrating a second modification wherein the basic shrine assembly as furnished by the casket manufacturer, is detachably secured to the casket body with slide fastener means.

FIG. 10 is a similar view, showing the same shrine assembly as finished by the merchandiser.

FIG. 11 is a cross-section taken on line 11—11 of FIG. 9.

FIG. 12 is a cross-section taken on line 12—12 of FIG. 10.

FIG. 13 is an inside elevation illustrating a third modification, wherein the basic shrine assembly as furnished by the casket manufacturer, is secured to the casket by nailing preparatory to stitching of the finish fabric thereto by the merchandiser.

FIG. 14 is a similar view, showing the same shrine assembly as covered and stitched by the merchandiser.

FIG. 15 is a cross-section taken on line 15—15 of FIG. 13.

FIG. 16 is a cross-section taken on line 16—16 of FIG. 14.

FIG. 17 is a cross-section through a casket rim and front wall, illustrating a fourth modification wherein the basic shrine assembly as furnished by the manufacturer, is fixed upon a detachable mounting strip of rubber, vinyl or the like, the assembly being shown depending inside the casket.

FIG. 18 is a fragmentary cross-section, showing the basic shrine assembly detached from the casket.

FIG. 19 is a view similar to FIG. 18, showing the shrine assembly of FIG. 18 as covered with decorative fabric by the merchandiser.

FIG. 20 is a cross-section showing the covered shrine assembly attached to a casket rim and depending therefrom interiorly of the casket.

FIG. 21 is a sectional view of the FIG. 20 assembly, showing the shrine depending exteriorly of the casket as in FIG. 1.

In offering burial caskets for sale, the jobber or merchandiser heretofore has endeavored to display and furnish his line of caskets with different grades, styles, and colors of shrines and interiors, in the interest of purchaser satisfaction. To so display and stock the caskets in the many modified forms of dress, necessitated maintaining a vast inventory of caskets and spacious warehousing facilities, all of which entailed great labor and expense factors. One object of the present invention is to substantially reduce the number of caskets needed, to place before the purchaser and supply him promptly with a casket meeting his cost limitations, and decorated or finished interiorly according to his wishes or requirements.

In modifying any given burial casket by substituting one kind of interior for another, the section thereof generally referred to as the "shrine," presents the greatest difficulty of substitution. The shrine generally is the most expensive and the most complex section of the interior, and is therefore to be handled with appropriate care. Unlike other less fragile sections of the interior, the shrine usually cannot safely be torn or ripped from the casket body and replaced by another, with the expectation of re-using the displaced shrine upon another casket in which it may fulfil a requirement. It is therefore imperative that detachment and replacement of the shrine assembly be facilitated, and accomplished in such manner as to preserve its original shape and condition.

In FIG. 1 of the drawings, 26 indicates generally the shrine which overlays the casket rim and depends exteriorly over the front wall 28 and the head end wall 30 of the casket. When the casket lid 32 is lowered to closed position, the shrine is to be folded into the casket and concealed therein. The blanket 34 is a separate element, and has no connection with the shrine.

In accordance with the present invention, the casket is delivered by the manufacturer to the jobber or merchandiser, with a basic shrine assembly detachably applied thereto exclusive, preferably, of any decorative fabric covering. Such covering as may be desired by the ultimate purchaser, is to be supplied by the jobber or merchandiser from a complete stock of different covers kept on hand for application to a casket chosen by the purchaser. Thus, a single casket may be quickly modified in various ways to meet the requirements of various purchasers, without the need for maintaining a large stock of caskets which may differ from one another only in the color, quality, or style of the interior dress.

With reference to FIGS. 2 to 6, inclusive, the rim 34 of the casket body carries the usual sealer 36 upon which the lid may close, and inside the rim is fixedly supported an elongate mounting strip or rail 38, usually of wood.

Strip 38 may be fixedly supported within the rim longitudinally of the front panel 28 and head end panel 30, using conventional means which may include an inner tongue 40 on the rim.

The casket manufacturer supplies two plain fabric bags A and B containing a soft filler material or padding 42. The bags have closed lower ends 44 and 46, and open opposite ends 48 and 50 which latter are folded upon one another and secured to mounting strip 38 at spaced intervals by means of nails or equivalent fasteners 52. Where the upper bag ends are folded against the mounting strip, there is fixed to the bags a series of spaced snap fastener elements 54, which may be the male elements of the fasteners. These are exposed interiorly of the casket body, to engage and detachably hold the female elements 56 as will be explained presently.

The foregoing applies to FIGS. 2 and 4, which illustrate the bag assembly as supplied by the manufacturer to the jobber or merchandiser. When the jobber or merchandiser decides to display or complete the casket assembly, he applies to bag B a shrine envelope 60 of decorative fabric (FIGS. 3, 5 and 6). Envelop 60 has a closed bottom 62, and opposite sides 64 and 66 which contain bag B. Envelop side 66 at its upper margin carries a series of female snap fastener elements 56, which register with and snap onto the make elements 54 to hold the envelope against downward shifting of the bag B. The opposite envelop side 64 extends upwardly approximately to the mouth of envelop 60, where at 68 it folds upon itself and depends downwardly as a flap or apron 70, between bags A and B. Apron or flap 70 is at least as long as the depth of bag A, which is conceals when bag B is swung upwardly and outwardly over the casket rim 34, as in FIG. 6, to perform as a shrine.

With further reference to FIG. 6, it should be noted that apron or flap 70 spans and covers the snap fasteners when the shrine overlies the casket exterior, and provides as well a smooth and neat continuation of the shrine downwardly inside the casket, for concealing the bag A.

Referring to FIG. 5, it is readily apparent that snap fastener element 56 may be disassociated from element 54, allowing shrine envelope 60 and its apron 70 to drop downwardly relative to bag B, for removal of the shrine envelope. A different shrine envelop then may be substituted, having the appearance or other qualities desired by the purchaser. The substitution is effected with ease and dispatch, as is obvious.

It should be understood that bag A and bag B, secured within the casket at the factory, extend along one side wall and the head end wall of the casket (FIG. 1), from the forward point of juncture of lids 72 and 32, and around the head end of the casket, to the hinge line of lid section 32. Likewise, the shrine envelop and its flap or apron 70 coextend with the bags along the same areas, to cover the bags and produce the desired decorative effect while suspended by snap fasteners along the side and head end walls interiorly of the casket. Bags A and B may be joined together by stitching 74, prior to application of the snap fastener elements 54 to the bag assembly.

In the modification, FIGS. 7 and 8, the padded bags A and B are identical to those of FIGS. 2 to 6, and are joined together along their upper ends by a row of stitching 76, or other appropriate means. Then at locations near the stitching, nails 78 are driven through one or both bags for securing them in pendant relationship to the mounting strips 38. This work is performed at the casket factory.

Upon receipt of the FIG. 7 casket, the jobber or merchandiser may apply a desired style of form of shrine envelop to bag B. The shrine envelop in this instance includes no snap fastener attachment to rail or strip 38, but is simply receptive of bag B without the use of fastening means. The shrine envelop is denoted by numeral 80 in FIG. 8, and has a mouth 82 defined by side walls 84 and 86. Wall 86 extends upwardly to a fold 88, where it is directly downwardly to provide a flap or apron 90 which depends inside the casket to cover and conceal the bag A.

When bag B of FIG. 8 is lifted upwardly and thrown across the casket rim as in FIG. 6, the apron 90 will perform as in FIG. 6 to cover the rim and sealer 36, as well as the thicknesses of material secured by stitching 76 and fasteners 78. The resulting shrine will have the same outward appearance as that of FIG. 6.

FIGS. 9 through 12 illustrate a further modification, in which the shrine envelop is detachably applied to bag B by means of a slide fastener or zipper. The shrine envelop, as before, may include sides 92 and 94 receptive of bag B, and an apron 93. Along the upper edge of side 92 is sewn, as at 96, one track section 98 of a slide fastener. The cooperative track section 100 of the slide fastener is secured, as by a line of stitching 102, to the upper ends of bags A and B which are joined together before nailing onto the mounting strip or rail 38. Nails for securing the bags to rail 38 are indicated at 104, and this attachment for bags A and B is performed at the casket factory. The slide fastener track 100 also is applied at the factory.

Upon receipt of the FIG. 11 casket from the factory, the jobber or merchandiser may apply a desired style or form of shrine envelop to bag B, as suggested by FIG. 12, using the slide fastener as the means of attaching the envelop to the bag. The shrine envelop as supplied by the jobber, will of course carry the track section 98 designed to interlock with the track section 100 supplied by the factory. A slider 106 performs in conventional manner, to lock and unlock the slide fastener sections.

Utilizing the means of FIGS. 9 through 12, the jobber may quickly and easily effect a substitution of shrine envelops whenever necessary.

In the still further modified form of the invention illustrated by FIGS. 13 through 16, the shrine envelop is secured to bags A and B by stitching. The factory applies bags A and B according to FIGS. 13 and 15, the bags being sewn together at 108 along their upper ends and then fixed to mounting rail 38 by means of nails 110.

Upon receipt of the FIG. 15 casket from the factory, the jobber or merchandiser may apply a desired shrine envelop to bag B, by sewing. The shrine envelop has sides 112 and 114 which confine bag B, FIG. 16, and side 114 is folded upon itself at 116 whence it depends as an apron or flap 118 to conceal bag A. The opposite side 112 of the envelope extends upwardly to the approximate level of rail 38, and may be secured by a line of stitching 120 to either or both of the bags A and B. In this form of construction, substitution of shrine envelops entails cutting the stitches 120 and restitching the substitute envelop in place. Staples or equivalent fasteners may be employed in lieu of stitching 120, if desired.

The modification illustrated by FIGS. 17 through 21 may be employed when no wooden mounting rail is used in constructing the casket. The rim 34 in this construction carries a fixed U-shaped trough member 122, into which depends the inner flange 124 of the rim, providing an open-topped pocket 126 along the front and end walls of the casket. Receivable in pocket 126 is an elongate resilient anchor strip having a head end 128 and a tail portion 130.

The head end of the anchor strip is provided with a hook 132, the purpose of which is to engage the lower free edge of flange 124 when the strip is inserted into pocket 126, thereby to oppose withdrawal of head 128 from the pocket. As the head and the hook are of rubber, vinyl, or comparable resilient material, however, the anchor strip with proper manipulation may be dislodged from pocket 126, and replaced repeatedly. Detachment of the anchor strip is readily accomplished by inserting a thin blade between flange 124 and the head 128, to pry the hook from beneath the flange. Such displacement of the head is facilitated by compression of the resilient fins 130 on the nether face of the head.

FIG. 17 illustrates the structure as assembled at the factory, with the upper ends of padded bags A and B stitched together at 131, and stitched or otherwise secured at 132 to the tail portion 130 of the anchor strip. The resilient tail portion bends upon itself to suspend the bags inside the casket.

The casket in the condition exemplified by FIG. 17, is received by the jobber or merchandiser, who will apply a shrine envelop as ordered by a purchaser. The shrine envelop (FIG. 20) comprises opposite fabric walls 134 and 136 confining the bag B. The uppermost end of wall 134 is to be fastened to tail portion 130 by the jobber or merchandiser, who will apply a line of stitching 138 or other fastening means for the purpose. This attachment may be performed with the anchor strip removed from pocket 126.

The wall 136 of the shrine envelop is turned upon itself at 140 and directed downwardly to provide the flap or apron 142 which conceals bag A. The lower ends of bags A and B are closed, as shown, to retain the padding or filling material therein.

With the bags A and B suspended, and the shrine envelop applied as in FIG. 20, bag B may be lifted upwardly and thrown over the casket rim, as in FIG. 21, to expose the shrine exteriorly of the casket. Apron 142 where it overlies the casket rim 34, will thereupon span and conceal the bag connections lying upon sealer 36, and provide a neat and smooth overlay. Anchor strip 128 will remain within the pocket 126, and bag A will depend into the casket interior.

Substitution of shrine assemblies in the structure of FIGS. 17 through 21, involves merely dislodging the anchor strip head 128 from pocket 126, and removing the assembly bodily for replacement with another having the qualities desired by the purchaser. If extra bag assemblies are not at hand, the shrine envelop may be detached from the anchor strip at the stitching 138, and replaced with a substitute shrine envelop. In this connection, it should be understood that stitching 138 may be dispensed with entirely, by furnishing the anchor strip and the shrine envelop with other cooperative attaching means, such as the snap fasteners or the slide fasteners hereinbefore referred to.

When substituting one shrine assembly for another in order to alter the appearance of the casket, it will usually be necessary to effect substitutions of materials in other parts of the casket also; however, such other substitutions are easily accomplished, and the present invention is not concerned therewith.

It is to be understood that various modifications and changes may be made in the structural details of the devices herein disclosed, within the scope of the appended claims and without departing from the spirit of the invention.

What is claimed is:

1. A burial casket comprising in combination, an open-topped receptacle having an upright front wall including a rim, and a mounting element supported by the rim, inner and outer flexible substantially flat padded bags each including an upper portion attached to the mounting element, for suspension of the bags interiorly of the receptacle in flatwise contact one against the other and in substantial parallelism with the front wall and with the inner bag in contact therewith, a shrine envelop of decorative fabric dimensioned to contain the outer bag, said envelope having inner and outer opposite sides confining said outer bag, and upper ends providing a mouth through which said outer bag is inserted into the envelop, cooperative separable means on the mounting element and on the upper end of the outer side of the envelop for normally suspending the envelop from the mounting element, and said envelop having a fold between said bags adjacent their upper ends and providing an apron depending from the remaining side of the envelop, for concealing the inner bag.

2. The combination as set forth in claim 1, wherein the apron is integral with the envelop side from which the apron depends, and wherein said separable means comprises a snap-fastening means.

3. A burial casket comprising in combination, an open-topped receptacle having an upright front wall including a rim having an upwardly opening pocket, an anchor strip having a head, and means on the head detachably inserted in the pocket, and a flexible tail portion on the head disposed exteriorly of the pocket, inner and outer flexible substantially flat padded bags each including an upper portion fixed to the tail portion of the anchor strip, for suspension of the bags interiorly of the receptacle in flatwise contact one against the other and in substantial parallelism with the front wall with the inner bag in contact therewith, a shrine envelop of decorative fabric dimensioned to contain the outer of said bags, said envelop having opposite sides confining said outer bag, and upper ends providing a mouth through which said outer bag is inserted into the envelop, means securing one of the envelop sides to the tail portion of the anchor strip, and an apron depending from the remaining side of the envelop, for concealing the inner bag.

4. The combination as set forth in claim 3, wherein the apron is integral along a fold line with that envelop side from which the apron depends.

5. A burial casket comprising in combination, an open-topped receptacle having an upright front wall including a rim, and a mounting element supported by the rim, inner and outer flexible substantially flat padded bags each including an upper portion attached to the mounting element, for suspension of the bags interiorly of the receptacle in flatwise contact one against the other and in substantial parallelism with the front wall with the inner bag in contact therewith, a shrine envelop of decorative material dimensioned to contain the outer of said bags, said envelop having opposite sides confining said outer bag, and upper ends providing an open mouth of less dimension than the lower end of the outer bag through which said outer bag is inserted into the envelop, said upper ends of the shrine envelop being disposed at the approximate elevation of the mounting element, and an apron depending from one of the envelop sides between the suspended bags, for contacting and concealing the inner bag.

6. The combination as set forth in claim 5, wherein the apron consists of a downturned extension of that envelop side which is between the suspended bags.

References Cited by the Examiner

UNITED STATES PATENTS

| 1,175,005 | 3/1916 | Mills | 27—19 |
| 1,952,439 | 3/1934 | Jones. | |
| 2,250,704 | 7/1941 | Donnelly | 27—19 |
| 2,848,782 | 8/1958 | Gillison | 27—17 |
| 3,014,261 | 12/1961 | Nelson | 27—19 |

FOREIGN PATENTS 26,621    1909    Great Britain.

RICHARD A. GAUDET, *Primary Examiner.*